(No Model.) 3 Sheets—Sheet 1.
H. S. BARTHOLOMEW.
CORN HARVESTER.

No. 319,054. Patented June 2, 1885.

Witnesses.
Jno. Edwards Jr.
Martin A. Pond

Inventor.
Harry S. Bartholomew.
By James Shepard Atty.

(No Model.) 3 Sheets—Sheet 3.

H. S. BARTHOLOMEW.
CORN HARVESTER.

No. 319,054. Patented June 2, 1885.

Witnesses.
John Edwards Jr.
Martin A. Pond

Inventor.
Harry S. Bartholomew.
By James Shepard
Atty.

UNITED STATES PATENT OFFICE.

HARRY S. BARTHOLOMEW, OF BRISTOL, CONNECTICUT.

CORN-HARVESTER.

SPECIFICATION forming part of Letters Patent No. 319,054, dated June 2, 1885.

Application filed September 17, 1883. (No model.)

*To all whom it may concern:*

Be it known that I, HARRY S. BARTHOLOMEW, a citizen of the United States, residing at Bristol, in the county of Hartford and State of Connecticut, have invented certain new and useful Improvements in Corn-Harvesters, of which the following is a specification.

My invention relates to improvements in machines for harvesting and husking corn; and the objects of my improvement are to provide for the efficient operation of the machine in many respects, as hereinafter described. I attain these objects by the mechanism illustrated in the accompanying drawings, in which—

Figure 1:
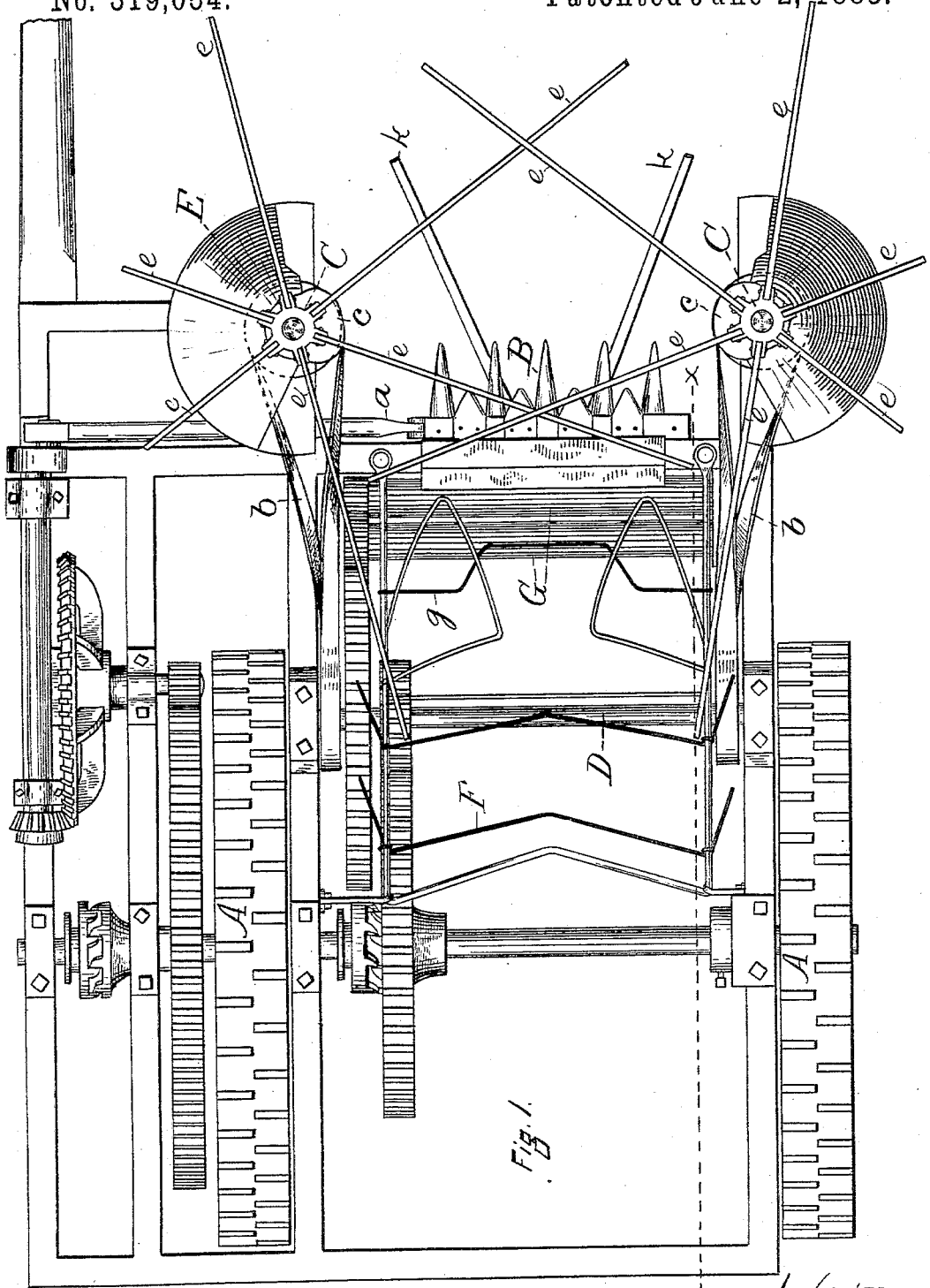
Figure 2:
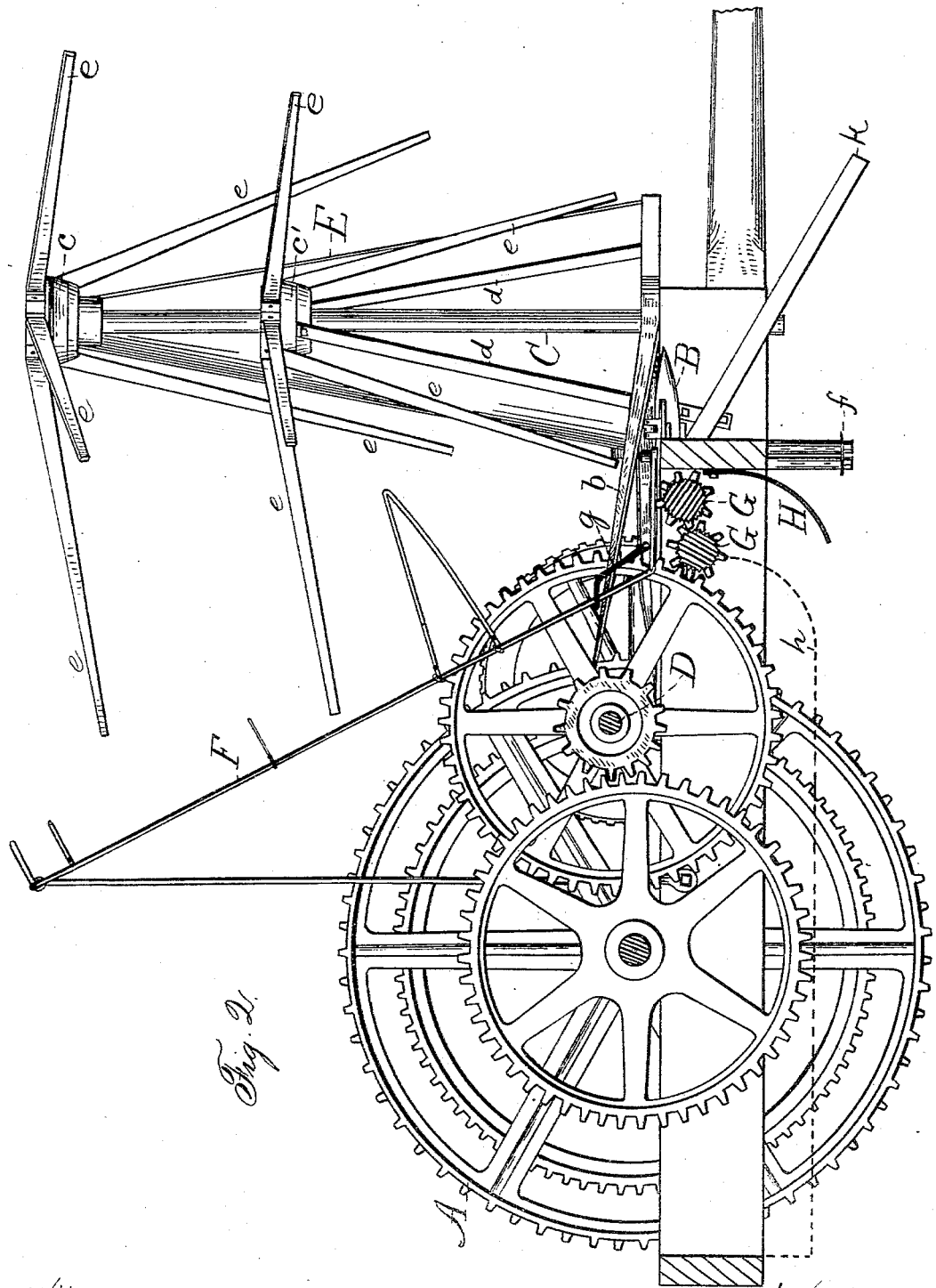
Figure 3:
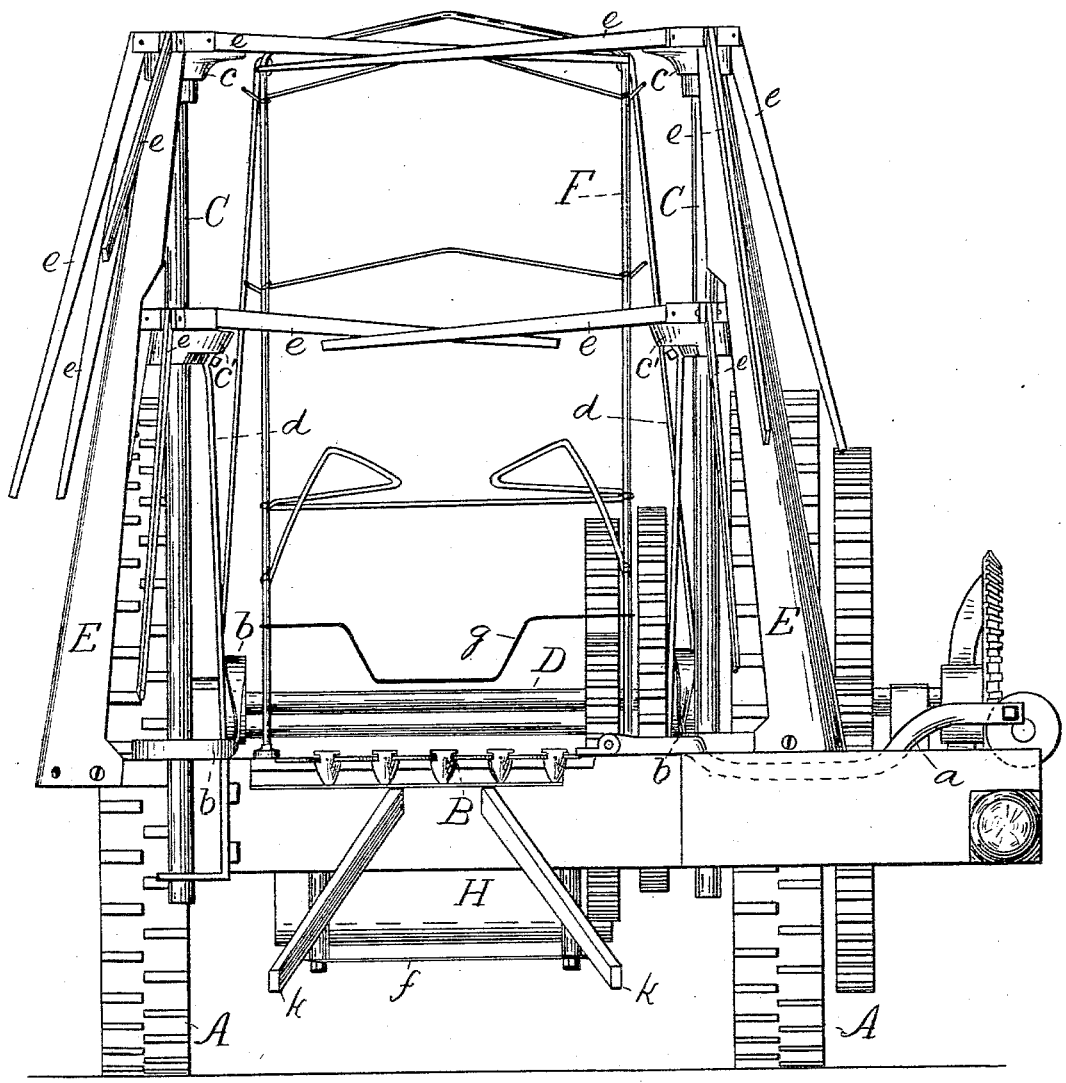

Figure 1 is a plan view of my machine. Fig. 2 is a vertical section thereof on line $xx$ of Fig. 1, the parts in the rear of said line being shown in elevation. Fig. 3 is a front elevation thereof.

As shown in the drawings, the machine is designed for cutting the stalks at a point just below the ears, which arrangement I consider the best when it is designed to both cut and husk the corn at one operation.

The main frame of the machine may be of any suitable design, mounted upon driving-wheels A, which are similar to those of a mowing-machine or harvester, and which, by a system of gears and connections, reciprocate the cutting-bar $a$, which with its connections may be substantially the same as in any known mowing-machine or harvester. I arrange the cutting apparatus B so as to be wide enough for cutting one row of corn at a time. By the sides of this cutting apparatus, I arrange two vertical shafts, C, which are caused to revolve by means of the belt or chains $b$, running over suitable drums or pulleys upon the shaft D. The upper ends of these shafts are supported in stationary bearings, which bearings are supported by means of the hood E. At the upper end of this hood are stationary cams $c$, and at a point lower down are other stationary cams $c'$, which are supported by means of suitable braces, $d$, extending upwardly from the frame of the machine inside of the hoods E and at some little distance from the side of said hoods. Upon each of these shafts I place a reel or reels composed of a series of gathering-fingers, $e$, the same being hinged to a slotted hub, which is rigidly secured to the shafts C.

The stationary cams are formed as most clearly shown in Fig. 1, so that as the shafts C revolve and the fingers come over the most projecting portions of the cams, they (the fingers) are thrown upward, as shown in the drawings, while as the said fingers come over the parts of the cams having less projections the fingers fall to a nearly vertical position, as also shown in the drawings. The fingers in the lower reel as they reach the outside of the machine fall to so nearly a vertical position as to pass around inside of the hood E and outside of the braces $dd$, while the fingers of the upper reel fall down nearly parallel with the sides of the hood. In both instances the fingers drop sufficiently to be out of the way of the adjoining rows of corn, while upon the sides which confront each other, and which are toward the cutting mechanism, the fingers are extended laterally and catch upon the corn and gather it inward, so as to present it properly to the cutting mechanism. It is intended to have the fingers move a little faster than the speed at which the machine is drawn, so that they will not only catch the stalks of corn and present them to the cutting mechanism, but so that they will bend the stalks slightly backward.

Underneath the front cross-bar of the framework I set the knife $f$, preferably slanting a little, with one end forward of the other, so as to give a drawing cut, which knife is for the purpose of cutting off the stubs or lower ends of the stalks as the machine passes over them, and causing them to fall upon the ground under the machine.

As the corn is cut by the cutting mechanism B the ingathering-fingers, after presenting the corn to said cutting mechanism, also carry it along to the rear thereof, keeping it substantially in a vertical position until the corn lies upon the slanting frame-work F. This framework is composed of a series of rods so arranged as to catch the stalks of corn, allowing the stalks to slant backward a little as they fall upon the frame, and then to fall downward upon the husking-rollers G G. These rollers are geared together so as to move in unison, and have a fluted surface, as shown. They are set close enough together to pinch the stalks of corn which are presented to the same butt first, and then their revolving motion will draw the stalks through the rollers and discharge the stalks at the under side of the machine.

After passing the husking-rollers the stalks strike upon the curved apron H, which apron will slant the butts of the stalks slightly backward and allow them to fall upon the ground under the machine. While the stalks are thus passing through the machine, the ears, which are larger than the stalk, approach the husking-rollers, and as said ears cannot readily pass through the rollers the stems of the ears is broken off and the ears fall down back of the rollers. The lower guard-rod, $g$, of the framework F, that catches the stalks, is so bent near its middle portion as to prevent the butts of the stalks from jumping or springing back into the rear of the husking-rollers at a point near the middle of the length of said rolls, and upon each side of the middle the guard-rod $g$ is sufficiently elevated above the rollers to allow the ears to pass under it as they work one side, in case they did not jump over the middle portion when they were broken off.

The broken lines $h$ in Fig. 2 indicate the bottom of a box or receptacle back of the husking-rollers, into which the ears will fall as they are broken off by the husker, while the stalks and husks fall upon the ground under the machine. Any other receptacle for the husked corn may be provided, or arrangement may be made for taking it from the receptacle as fast as it may be desired.

Upon the front cross-piece of the frame I have also arranged two diverging arms, $k$ $k$, which also slant downward a little for the purpose of gathering any straggling stalks and drawing them toward the middle of the machine as it advances.

The fluted husking-rollers are connected by a train of gearing with the shaft upon which the driving-wheels A A are mounted, so as to be driven thereby as the machine is drawn over the field.

While I have herein shown and described two sets of ingathering-fingers—one above the other—and I propose to use two sets, the machine may be made to do good work with only one set of fingers upon each side of the cutting mechanism.

Instead of placing the husking-rollers immediately in the rear of the cutting mechanism, they may be placed farther back, or at any other point of the machine, and suitable means be provided for properly conducting the stalks from the cutting mechanism to the husking-rollers.

I am aware that a prior patent for a corn-harvester shows but does not claim a set of angular arms hinged to a hub and arranged upon one side only of the cutting mechanism to revolve about a stationary cam with the shorter member of the arms resting upon a cam, so as to let the longer member of the arms drop when approaching the cutting mechanism, and then rise again to nearly a vertical position, so as to be out of the way. A corn-harvester having such a set of arms is hereby disclaimed.

I have herein shown and described husking-rollers in combination with the cutting mechanism and ingathering mechanism; but I make no claim in the application to anything based upon the husking-rollers, because I have divided the case and embodied the husking-rollers in another application which I am about to file as a substitute for the application No. 106,619, filed September 17, 1883, and about to be withdrawn.

I claim as my invention—

1. In a corn-harvester, the combination of cutting mechanism, the revolving shafts C C, one upon each side thereof, a set of hinged fingers secured to each of said shafts, and the stationary cams upon which the fingers bear, the whole combined so that the fingers are successively raised as they come together over the cutting mechanism and fall into a pendent position after passing each other, substantially as described, and for the purpose specified.

2. In a corn-harvester reel, the combination of the revolving shaft C, two sets of hinged fingers secured thereon, one over the other, and the stationary cams $c$ and $c'$, supported by suitable standards, substantially as described, and for the purpose specified.

HARRY S. BARTHOLOMEW.

Witnesses:
MARTIN A. POND,
JOHN EDWARDS, Jr.